M. SHARP.
SPRING WHEEL.
APPLICATION FILED APR. 7, 1917.

1,245,991.

Patented Nov. 6, 1917.

Inventor
MITCHELL SHARP
By N. S. Hill
Attorney

UNITED STATES PATENT OFFICE.

MITCHELL SHARP, OF DUNMORE, WEST VIRGINIA, ASSIGNOR OF ONE-THIRD TO WINFRED McELWEE, OF DUNMORE, WEST VIRGINIA.

SPRING-WHEEL.

1,245,991. Specification of Letters Patent. Patented Nov. 6, 1917.

Application filed April 7, 1917. Serial No. 160,429.

*To all whom it may concern:*

Be it known that I, MITCHELL SHARP, a citizen of the United States, residing at Dunmore, in the county of Pocahontas, State of West Virginia, have invented a new and useful Spring-Wheel; and I do hereby declare the following to be a full, clear, and exact description of the invention, such as will enable others skilled in the art to which it appertains to make and use the same.

The present invention relates to certain new and useful improvements in cushion tires, and has for its object to provide a device of this character which embodies novel features of construction whereby the resiliency is derived principally from metallic springs, thereby avoiding the necessity of using inflated tubes, the latter being objectionable for the reason that they are always liable to puncture.

Further objects of the invention are to provide a cushion tire which is comparatively simple and inexpensive in its construction, which can be readily applied to a wheel, which can be taken apart for repairs without difficulty, and which will effectively absorb the shocks and jars in substantially the same manner as an ordinary pneumatic tire.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawings by the same reference characters.

Figure 1:
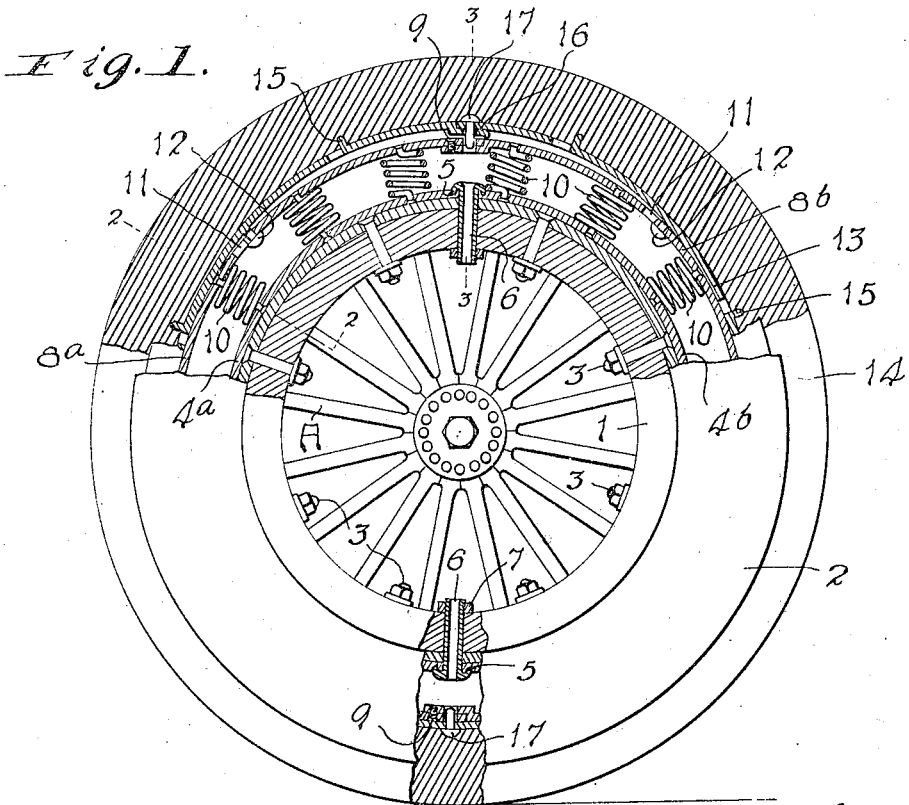
Figure 1 is a side elevation of a wheel provided with a cushion tire constructed in accordance with the invention, parts being broken away and shown in section to illustrate more clearly the details of construction.
Figure 2:
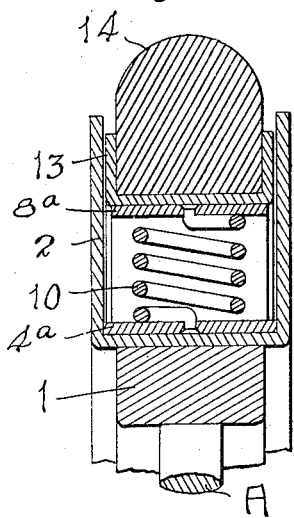
Fig. 2 is an enlarged transverse sectional view on the line 2—2 of Fig. 1.

Referring to the drawings, which illustrate one embodiment of the invention, the numeral 1 designates the felly of a vehicle wheel A which may be of any conventional construction. Surrounding the felly 1 of the wheel is a channel shaped rim 2 which is permanently secured in position by suitable fastening means such as the bolts 3. Seated within the base of the channel shaped rim 2 is a band which for convenience of assembling may be formed in two complemental sections $4^a$ and $4^b$, each of the sections being of sufficient length to extend around one-half of the channel shaped rim, and the ends of the band sections being formed with depressions which are engaged by lugs 5 on the heads of tubular bolts 6 which extend through the felly 1. Nuts 7 are threaded upon the inner ends of the tubular bolts 6, and it will be obvious that when the parts are properly assembled and the bolts tightened the two sections $4^a$ and $4^b$ of the inner band will be held firmly in position against the base of the channel shaped rim 2.

An outer flexible band which has a spaced relation to the inner band is also arranged within the channel shaped rim 2, said outer band being similarly formed in complemental halves $8^a$ and $8^b$, the ends of which may overlap and be secured by suitable fastening members, as indicated at 9. A series of radially disposed coil springs 10 are interposed between the inner band and outer band, the ends of the coil springs being permanently secured to the respective bands. These springs provide a resilient support for the outer flexible band, and the tire is designed to derive its resiliency primarily from these springs.

Figure 3:
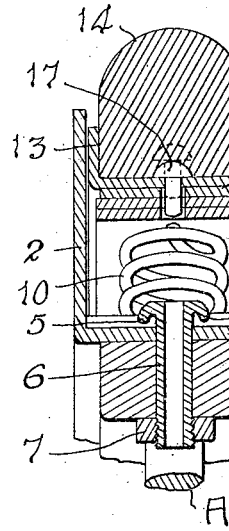
Fig. 3 is a similar view on the line 3—3 of Fig. 1.
Figure 4:
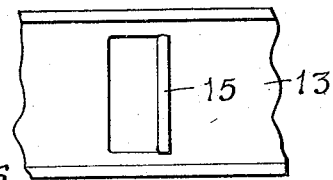
Fig. 4 is a plan view of a fragmentary portion of the tire carrying ring.
Figure 5:
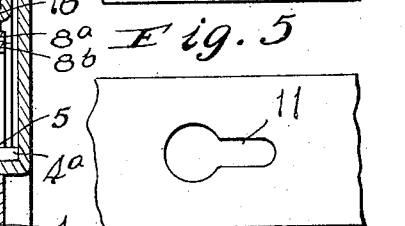
Fig. 5 is a similar view of a fragmentary portion of the outer flexible band.

The outer flexible band is provided at intervals with key-hole slots 11 which are adapted to interlock with headed studs 12 projecting inwardly from the ring 13 upon which the solid rubber tire 14 is fitted. A series of lugs 15 are stamped from the ring 13 at intervals and bent outwardly so as to engage the tire 14 and anchor the tire firmly in position thereon, thereby preventing possible rotation of the tire upon the ring. For convenience in assembling the parts the ring 13 is split, the ends thereof overlapping each other at 16 and being provided with corresponding perforations to receive a locking pin 17, said locking pin also engaging an opening in the overlapping ends of the outer band sections 8ª and 8ᵇ, and thereby serving to prevent rotation of the tire carrying ring 13 upon the said outer band. A second locking pin 17 is located at the opposite side of the wheel and acts in a similar manner. It will be noted that these two locking pins 17 are both located opposite the tubular bolts 6 employed for holding the sections 4ª and 4ᵇ of the inner spring carrying band in position, and by inserting a rod or plunger through these tubular bolts 6 the locking pins 17 can be readily forced outwardly into inoperative position when it is desired to remove the tire and tire carrying ring from the channel shaped rim. In this connection it will be remembered that the tire 14 is formed of rubber so that it will yield or stretch a sufficient amount to admit of the locking pins 17 being forced outwardly by pressure against the inner ends thereof, as indicated by dotted lines on Fig. 3 of the drawing, when it is desired to remove the tire carrying ring 13, and it is merely necessary to force the locking pins outwardly until the inner ends thereof are flush with the outer surface of the outer band and the inner surface of the tire ring, after which a slight rotation of the tire ring will move the pins 17 out of registry with the openings in the outer band. The plunger or rod need not be forced into the pin opening in the tire ring so as to prevent rotation thereof by engagement of the plunger with the pin opening in the tire ring. After these locking pins 17 have been moved into inoperative position the tire carrying ring 13 can be rotated to disengage the headed studs 12 from the key-hole slots 11 of the outer flexible band. When the tire is in operation, however, the locking pins 17 prevent rotation of the tire carrying ring 13 upon the outer flexible band, and maintain the headed studs 12 in an interlocking engagement with the key-hole slots 11.

In assembling the tire upon the wheel rim the inner channel rim 2 is first secured to the wheel rim 1 by means of the bolts 3. The corresponding sections 4ª and 8ª and 4ᵇ and 8ᵇ of the inner and outer bands are then applied to the base of the channel rim 2 with the springs 10 interposed between the respective sections of the bands, after which the tubular bolts 6 are inserted and the heads thereof clamped down against the ends of the sections 4ª and 4ᵇ of the inner band. The corresponding ends of the sections 8ª and 8ᵇ of the outer band are then secured together by means of the fastening members 9. The tire ring 13 is now applied to the outer band and rotated until the headed studs 12 obtain a proper engagement with the key hole slots 11, after which the ends of the tire ring are overlapped, and the pins 17 inserted in position passing through both the tire ring and the outer band. The tire 14 is then stretched over the flanges of the inner channel rim 2 and slipped into the tire carrying ring 13. The operation for removing the tire from the wheel has been above described.

Having thus described the invention, what I claim as new and desire to secure by Letters Patent, is:—

1. A device of the character described, including a rim, a flexible band surrounding the rim and provided with key-hole slots, springs interposed between the flexible band and the rim, a tire carrying ring surrounding the flexible band and provided with headed studs which have an interlocking connection with the key-hole slots therein, locking means for holding the tire carrying ring against rotation upon the flexible band, and a tire applied to the tire carrying ring.

2. A device of the character described including a rim, a flexible band surrounding the rim and provided with key-hole slots, springs interposed between the flexible band and the rim, a split tire carrying ring applied to the flexible band and having overlappings ends, headed studs projecting from the tire carrying ring and arranged to interlock with the key-hole slots of the flexible band, a locking pin passing through the overlapping ends of the tire carrying ring and engaging the flexible band to hold the tire carrying ring against rotation, and a tire fitted upon the tire carrying ring.

3. A device of the character described, including a rim, an inner spring carrying band seated upon the rim, a tubular fastening member for securing the inner spring carrying band in position, an outer flexible spring carrying band, springs interposed between the spring carrying bands and connected thereto, a tire carrying ring surrounding the outer flexible band, a locking pin engaging the tire carrying ring and the outer flexible band for holding the former against rotation, said locking pin being disposed opposite the before mentioned tubular bolt so that it can be unseated by inserting a tool through the tubular bolt, and a tire applied to the tire carrying ring.

4. A device of the character described including a channel shaped rim, an inner spring carrying band seated in the channel shaped rim and formed in complemental sections, tubular bolts extending through the channel shaped rim and engaging the ends of the complemental sections of the inner band to hold the band sections in position, an outer flexible band formed in similar complemental sections, springs interposed between the outer and inner bands and connected thereto, a tire carrying ring surrounding the outer flexible band and having an interlocking connection therewith, said tire carrying ring being formed with overlapping ends, a locking pin extending through the overlapping ends and engaging the outer flexible band to hold the tire carrying ring against rotation, said locking pin being arranged opposite one of the before mentioned tubular bolts so that it can be unseated from position by inserting a tool through the tubular bolt, and a tire applied to the tire carrying ring.

In testimony whereof I have signed my name to this specification in the presence of two subscribing witnesses.

MITCHELL SHARP.

Witnesses:
 EARNEST G. SHARP,
 W. J. PRITCHARD.